US011608083B2

(12) United States Patent
Nakhaei Sarvedani et al.

(10) Patent No.: US 11,608,083 B2
(45) Date of Patent: Mar. 21, 2023

(54) SYSTEM AND METHOD FOR PROVIDING COOPERATION-AWARE LANE CHANGE CONTROL IN DENSE TRAFFIC

(71) Applicant: Honda Motor Co., Ltd., Tokyo (JP)

(72) Inventors: Alireza Nakhaei Sarvedani, San Jose, CA (US); Kikuo Fujimura, Palo Alto, CA (US); Chiho Choi, San Jose, CA (US); Sangjae Bae, Berkley, CA (US); Dhruv Mauria Saxena, Pittsburgh, PA (US)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 16/844,331

(22) Filed: Apr. 9, 2020

(65) Prior Publication Data

US 2021/0078603 A1   Mar. 18, 2021

Related U.S. Application Data

(60) Provisional application No. 62/902,180, filed on Sep. 18, 2019.

(51) Int. Cl.
*B60W 60/00* (2020.01)
*B60W 30/18* (2012.01)
(Continued)

(52) U.S. Cl.
CPC ............... *B60W 60/0027* (2020.02); *B60W 30/18163* (2013.01); *B60W 60/0011* (2020.02); *G06N 3/08* (2013.01); *G06V 20/588* (2022.01)

(58) Field of Classification Search
CPC ......... B60W 60/0027; B60W 60/0011; B60W 30/18163; G06V 20/588; G06N 3/08
See application file for complete search history.

(56) References Cited

U.S. PATENT DOCUMENTS

2010/0057361 A1\* 3/2010 Caveney ............... B60W 30/08
701/469
2019/0220014 A1\* 7/2019 Bradley ............... G01S 13/931
(Continued)

FOREIGN PATENT DOCUMENTS

JP   2015148545   8/2015
JP   2017084110   5/2017
(Continued)

OTHER PUBLICATIONS

Alexandre Alahi, Kratarth Goel, Vignesh Ramanathan, Alexandre Robicquet, Li Fei-Fei, and Silvio Savarese. Social lstm: Human trajectory prediction in crowded spaces. In Proceedings of the IEEE conference on computer vision and pattern recognition, pp. 961-971, 2016.

(Continued)

*Primary Examiner* — Anne Marie Antonucci
*Assistant Examiner* — Patrick M Brady
(74) *Attorney, Agent, or Firm* — Rankin, Hill & Clark LLP

(57) ABSTRACT

A system and method for providing cooperation-aware lane change control in dense traffic that include receiving vehicle dynamic data associated with an ego vehicle and receiving environment data associated with a surrounding environment of the ego vehicle. The system and method also include utilizing a controller that includes an analyzer to analyze the vehicle dynamic data and a recurrent neural network to analyze the environment data. The system and method further include executing a heuristic algorithm that sequentially evaluates the future states of the ego vehicle and the predicted interactive motions of the surrounding vehicles to promote the cooperation-aware lane change control in the dense traffic.

20 Claims, 6 Drawing Sheets

(51) Int. Cl.
G06N 3/08 (2006.01)
G06V 20/56 (2022.01)

(56) References Cited

U.S. PATENT DOCUMENTS

2019/0369637 A1* 12/2019 Shalev-Shwartz ............................ G01C 21/3415
2020/0010077 A1* 1/2020 Cormack ................ B60R 21/01

FOREIGN PATENT DOCUMENTS

| JP | 2017206152 | 11/2017 |
| JP | 2018055141 | 4/2018 |
| JP | 2019519851 | 7/2019 |
| WO | WO2019106789 | 6/2019 |

OTHER PUBLICATIONS

Sangjae Bae, Yeojun Kim, Jacopo Guanetti, Francesco Borrelli, and Scott Moura. Design and implementation of ecological adaptive cruise control for autonomous driving with communication to traffic lights. arXiv preprint arXiv:1810.12442, 2018.

Sangjae Bae, Yongkeun Choi, Yeojun Kim, Jacopo Guanetti, Francesco Borrelli, and Scott Moura. Real-time ecological velocity planning for plug-in hybrid vehicles with partial communication to traffic lights. arXiv preprint arXiv:1903.08784.

Mariusz Bojarski, Philip Yeres, Anna Choromanska, Krzysztof Choromanski, Bernhard Firner, Lawrence Jackel, and Urs Muller. Explaining how a deep neural network trained with end-to-end learning steers a car. arXiv preprint arXiv:1704.07911, 2017.

Maxime Bouton, Alireza Nakhaei, Kikuo Fujimura, and Mykel J Kochenderfer. Cooperation-aware reinforcement learning for merging in dense traffic. arXiv preprint arXiv:1906.11021, 2019.

Rajashekar Chandra, Yuvaraj Selvaraj, Mattias Brännström, Roozbeh Kianfar, and Nikolce Murgovski. Safe autonomous lane changes in dense traffic. In 2017 IEEE 20th International Conference on Intelligent Transportation Systems (ITSC), pp. 1-6. IEEE, 2017.

Chenyi Chen, Ari Seff, Alain Kornhauser, and Jianxiong Xiao. Deep-driving: Learning affordance for direct perception in autonomous driving. In Proceedings of the IEEE International Conference on Computer Vision, pp. 2722-2730, 2015.

Chiho Choi, Abhishek Patil, and Srikanth Malla. Drogon: A causal reasoning framework for future trajectory forecast. arXiv preprint arXiv:1908.00024, 2019.

John C Doyle, Bruce A Francis, and Allen R Tannenbaum. Feedback control theory. Courier Corporation, 2013.

Javier Garcia and Fernando Fernandez. A comprehensive survey on safe reinforcement learning. Journal of Machine Learning Research, 16(1):1437-1480, 2015.

Agrim Gupta, Justin Johnson, Li Fei-Fei, Silvio Savarese, and Alexandre Alahi. Social gan: Socially acceptable trajectories with generative adversarial networks. In Proceedings of the IEEE Conference on Computer Vision and Pattern Recognition, pp. 2255-2264, 2018.

Cem Hatipoglu, Umit Ozguner, and Keith A Redmill. Automated lane change controller design. IEEE transactions on intelligent transportation systems, 4(1):13-22, 2003.

Yeping Hu, Alireza Nakhaei, Masayoshi Tomizuka, and Kikuo Fujimura. Interaction-aware decision making with adaptive slategies under merging scenarios. In 2019 IEEE/RSJ International Conference on Intelligent Robots and Systems (IROS). IEEE, 2019.

David Isele, Alireza Nakhaei, and Kikuo Fujimura. Safe reinforcement learning on autonomous vehicles. In 2018 IEEE/RSJ International Conference on Intelligent Robots and Systems (IROS), 2018.

Arne Kesting, Martin Treiber, and Dirk Helbing. General lane-changing model mobil for car-following models. Transportation Research Record, 1999(1):86-94, 2007.

Jason Kong, Mark Pfeiffer, Georg Schildbach, and Francesco Borrelli. Kinematic and dynamic vehicle models for autonomous driving control design. IEEE Intelligent Vehicles Symposium, Proceedings, Aug. 2015:1094-1099, 2015.

Axel Legay, Bendit Delahaye, and Saddek Bensalem. Statistical model checking: An overview. In International conference on runtime verification, pp. 122-135. Springer, 2010.

Jesse Levinson, Jake Askeland, Jan Becker, Jennifer Dolson, David Held, Soeren Kammel, J Zico Kolter, Dirk Langer, Oliver Pink, Vaughan Pratt, et al. Towards fully autonomous driving: Systems and algorithms. In 2011 IEEE Intelligent Vehicles Symposium (IV), pp. 163-168. IEEE, 2011.

Jose E Naranjo, Carlos Gonzalez, Ricardo Garcia, and Teresa De Pedro. Lane-change fuzzy control in autonomous vehicles for the overtaking maneuver. IEEE Transactions on Intelligent Transportation Systems, 9(3):438-450, 2008.

Dorsa Sadigh, Shankar Sastry, Sanjit A Seshia, and Anca D Dragan. Planning for autonomous cars that leverage effects on human actions. In Robotics: Science and Systems, vol. 2. Ann Arbor, MI, USA, 2016.

Dhruv Mauria Saxena, Sangjae Bae, Alireza Nakhaei, Kikuo Fujimura, and Maxim Likhachev. Driving in dense traffic with model-free reinforcement learning. arXiv preprint arXiv:1909.06710, 2019.

Georg Schildbach and Francesco Borrelli. Scenario model predictive control for lane change assistance on highways. In 2015 IEEE Intelligent Vehicles Symposium (IV), pp. 611-616. IEEE, 2015.

Shai Shalev-Shwartz, Shaked Shammah, and Amnon Shashua. Safe, multi-agent, reinforcement learning for autonomous driving. arXiv preprint arXiv:1610.03295, 2016.

Stanford Intelligent Systems Laboratory. Automotivedrivingmodels.jl. https://github.com/sisl/ AutomotiveDrivingModels.il, 2019.

Yuchi Tian, Kexin Pei, Suman Jana, and Baishakhi Ray. Deeptest: Automated testing of deep-neural-network-driven autonomous cars. In Proceedings of the 40th international conference on software engineering, pp. 303-314. ACM, 2018.

Martin Treiber, Ansgar Hennecke, and Dirk Helbing. Congested traffic states in empirical observations and microscopic simulations. Physical review E, 62(2):1805, 2000.

Simon Ulbrich and Markus Maurer. Probabilistic online pomdp decision making for lane changes in fully automated driving. In 16th International IEEE Conference on Intelligent Transportation Systems (ITSC 2013), pp. 2063-2067. IEEE, 2013.

Michael P Vitus and Claire J Tomlin. A probabilistic approach to planning and control in autonomous urban driving. In 52nd IEEE Conference on Decision and Control, pp. 2459-2464. IEEE, 2013.

Feng You, Ronghui Zhang, Guo Lie, Haiwei Wang, Huiyin Wen, and Jianmin Xu. Trajectory planning and tracking control for autonomous lane change maneuver based on the cooperative vehicle infrastructure system. Expert Systems with Applications, 42(14):5932-5946, 2015.

* cited by examiner

SYSTEM AND METHOD FOR PROVIDING COOPERATION-AWARE LANE CHANGE CONTROL IN DENSE TRAFFIC

CROSS-REFERENCE TO RELATED APPLICATION

This application claims priority to U.S. Provisional Application Ser. No. 62/902,180 filed on Sep. 18, 2019, which is expressly incorporated herein by reference.

BACKGROUND

An autonomous-driving ego vehicle is no longer a futuristic concept and extensive researches have been conducted in various aspects, spanning from localization, perceptions, and controls to implementations and validations. Much research has focused on robust controls that provide path overlap avoidance techniques. Additionally, emphasis has been put on lane change methods that extend longitudinal controls that may be based on recognition of additional lanes and ego vehicles. These methods often use probabilistic models or scenario-based models to predict adjacent driver's motions. However, much of the research may not apply in highly dense traffic areas where interactions with human drivers are essential to changing lanes.

BRIEF DESCRIPTION

According to one aspect, a computer-implemented method for providing cooperation-aware lane change control in dense traffic that includes receiving vehicle dynamic data associated with an ego vehicle and receiving environment data associated with a surrounding environment of the ego vehicle. The computer-implemented method also includes utilizing a controller that includes an analyzer to analyze the vehicle dynamic data and a recurrent neural network to analyze the environment data. The analyzer is configured to predict future states of the ego vehicle and the recurrent neural network is configured to predict interactive motions of surrounding vehicles located within the surrounding environment of the ego vehicle. The computer-implemented method further includes executing a heuristic algorithm that sequentially evaluates the future states of the ego vehicle and the predicted interactive motions of the surrounding vehicles to promote the cooperation-aware lane change control in the dense traffic.

According to another aspect, a system for providing cooperation-aware lane change control in dense traffic that includes a memory storing instructions when executed by a processor cause the processor to receive vehicle dynamic data associated with an ego vehicle and receive environment data associated with a surrounding environment of the ego vehicle. The instructions also cause the processor to utilize a controller that includes an analyzer to analyze the vehicle dynamic data and a recurrent neural network to analyze the environment data. The analyzer is configured to predict future states of the ego vehicle and the recurrent neural network is configured to predict interactive motions of surrounding vehicles located within the surrounding environment of the ego vehicle. The instructions further cause the processor to execute a heuristic algorithm that sequentially evaluates the future states of the ego vehicle and the predicted interactive motions of the surrounding vehicles to promote the cooperation-aware lane change control in the dense traffic.

According to yet another aspect, a non-transitory computer readable storage medium storing instructions that when executed by a computer, which includes a processor perform a method that includes receiving vehicle dynamic data associated with an ego vehicle and receiving environment data associated with a surrounding environment of the ego vehicle. The computer-implemented method also includes utilizing a controller that includes an analyzer to analyze the vehicle dynamic data and a recurrent neural network to analyze the environment data. The analyzer is configured to predict future states of the ego vehicle and the recurrent neural network is configured to predict interactive motions of surrounding vehicles located within the surrounding environment of the ego vehicle. The computer-implemented method further includes executing a heuristic algorithm that sequentially evaluates the future states of the ego vehicle and the predicted interactive motions of the surrounding vehicles to promote the cooperation-aware lane change control in the dense traffic.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
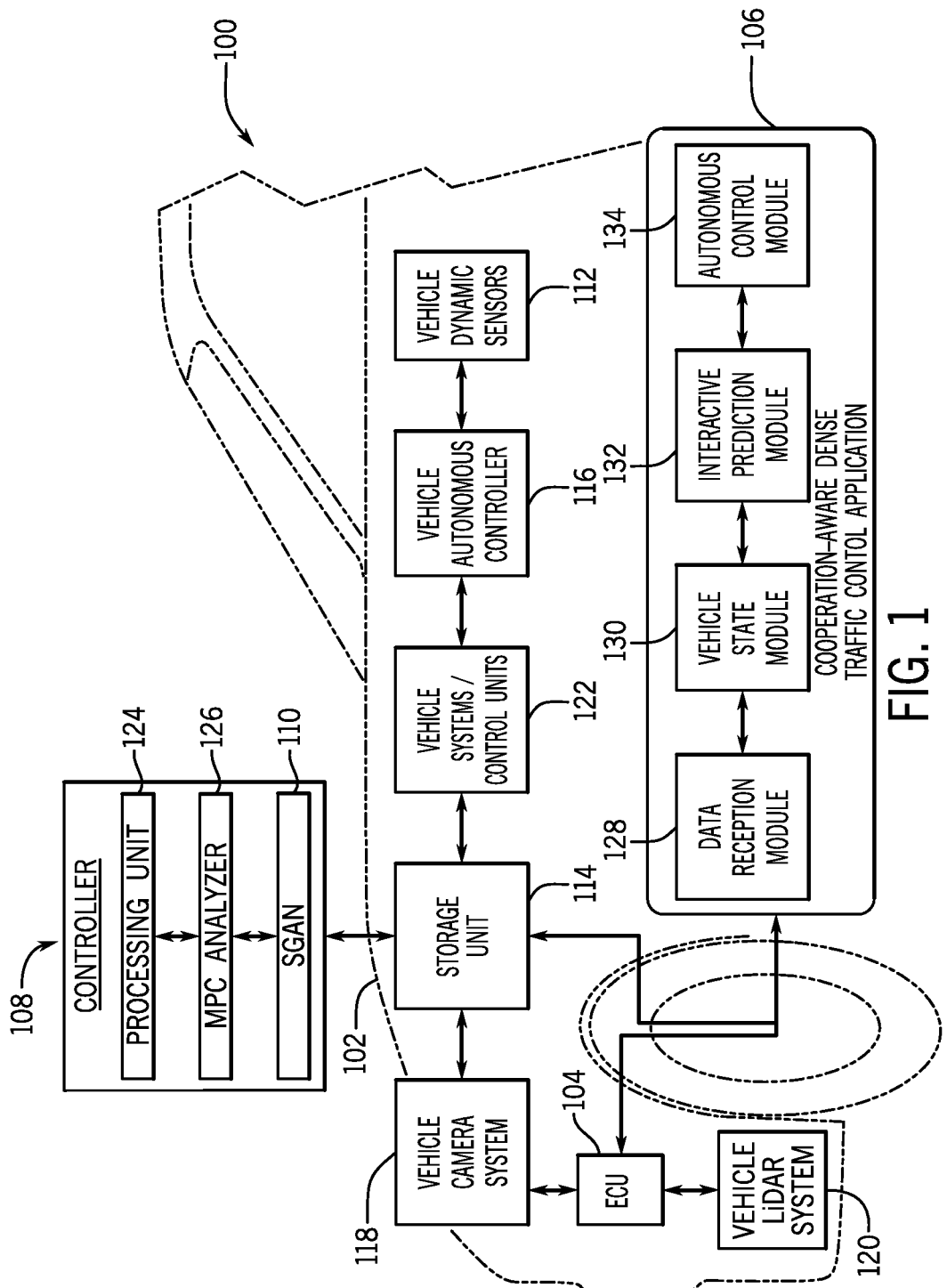
FIG. 1 is a schematic view of an exemplary operating environment for implementing systems and methods for providing cooperation-aware lane change control in dense traffic according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for providing cooperation-aware lane change control in dense traffic according to an exemplary embodiment of the present disclosure. The components of the environment 100, as well as the components of other systems, hardware architectures, and software architectures discussed herein, may be combined, omitted, or organized into different architectures for various embodiments.

Generally the environment 100 includes an ego vehicle 102 with an electronic control unit (ECU) 104 that executes one or more applications, operating systems, ego vehicle system and subsystem user interfaces, among others. The ECU 104 may also execute a cooperation-aware dense traffic control application (cooperation-aware application) 106 that may be configured to provide cooperation-aware lane change control of the ego vehicle 102 in dense traffic conditions. As discussed in more detail below, the cooperation-aware application 106 may be configured to receive vehicle dynamic data associated with one or more sensed dynamic parameters pertaining to an autonomous operation of the ego vehicle 102 that be inputted as a current state of the ego vehicle 102 to a mathematical control framework controller (controller) 108.

The controller 108 may be configured to utilize a mathematical model to predict future positions of the ego vehicle 102 based on the states and may make predictions of interactions with respect to drivers of surrounding vehicles that are located within the surrounding environment of the ego vehicle 102 to ensure that control constraints are followed to autonomously control the ego vehicle 102 to smoothly (e.g., efficiently, without sudden acceleration, without sudden braking, without jerking, without sharp turning, without overlap with paths of surrounding vehicles, without cutting off surrounding vehicles) change lanes to a desired target lane.

Figure 5:
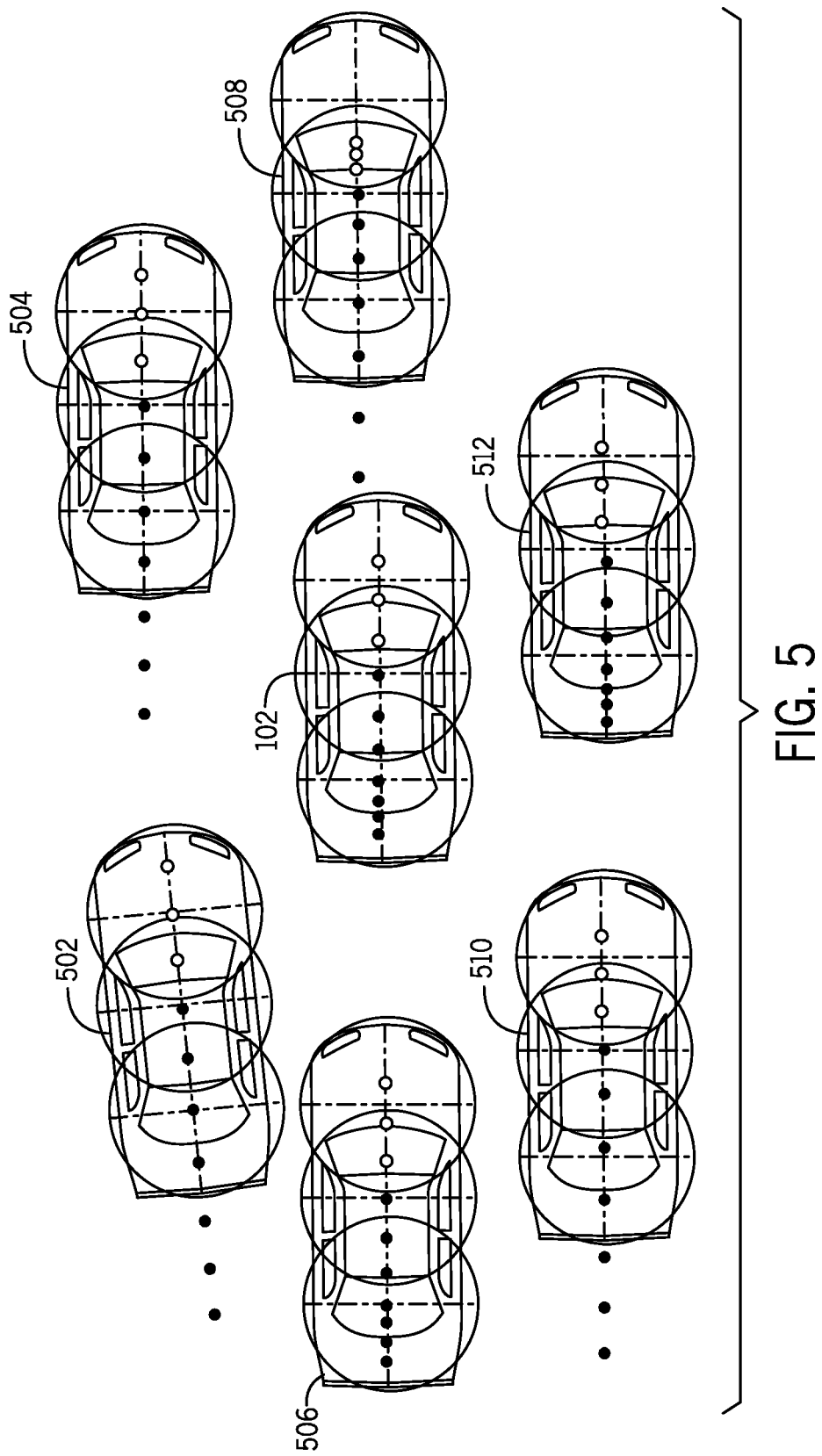
FIG. 5 is an illustrative example of a vehicle shape model executed by a Social Generative Adversarial Network according to an exemplary embodiment of the present disclosure.

The application 106 be configured to receive environmental data associated with a surrounding environment of the ego vehicle 102 that includes a roadway that may include lanes of the roadway and the surrounding vehicles (shown in FIG. 5). As discussed below, the cooperation-aware application 106 may be configured to utilize a Social Generative Adversarial Network (SGAN) 110. The SGAN 110 may be configured as a recurrent neural network that may be configured to analyze positions of surrounding vehicles (not shown) that are located within the surrounding environment of the ego vehicle 102 to predict (nonlinear) interactive motions of the surrounding vehicles (at t+1, t+2, etc. timeframes) (e.g., predictive driving maneuvers of drivers of surrounding vehicles). The predicted interactive motions of the surrounding vehicles as predicted by the SGAN 110 and future states (e.g., positions, speed, heading, etc.) of the ego vehicle 102 as predicted by the controller 108 may be analyzed by a heuristic algorithm with respect to an adherence to control constraints that may be computed by the controller 108. As discussed below, such control constraints may be computed to provide constraints on the operation of the ego vehicle 102 to avoid an overlap of paths of the ego vehicle 102 with the surrounding vehicles that may be based on the predictive interactive motions.

Accordingly, particular control candidates that include perspective vehicle dynamic parameters associated with the control of the ego vehicle 102 that may adhere to the control constraints may be utilized to provide one or more autonomous control parameters that may be executed to autonomously operate the ego vehicle 102 during a lane changing scenario. Accordingly, the application 106 may allow the ego vehicle 102 to merge into a target lane of the roadway on which the ego vehicle 102 is traveling while avoiding an overlap with the path(s) of surrounding vehicles that may be traveling on the roadway (e.g., during the dense traffic conditions). The application 106 may additionally ensure that the autonomous control of the ego vehicle 102 allows for smooth accelerations, braking, steering, and the like to thereby ensure a smooth lane change of the ego vehicle 102 to a target lane.

Figure 2:
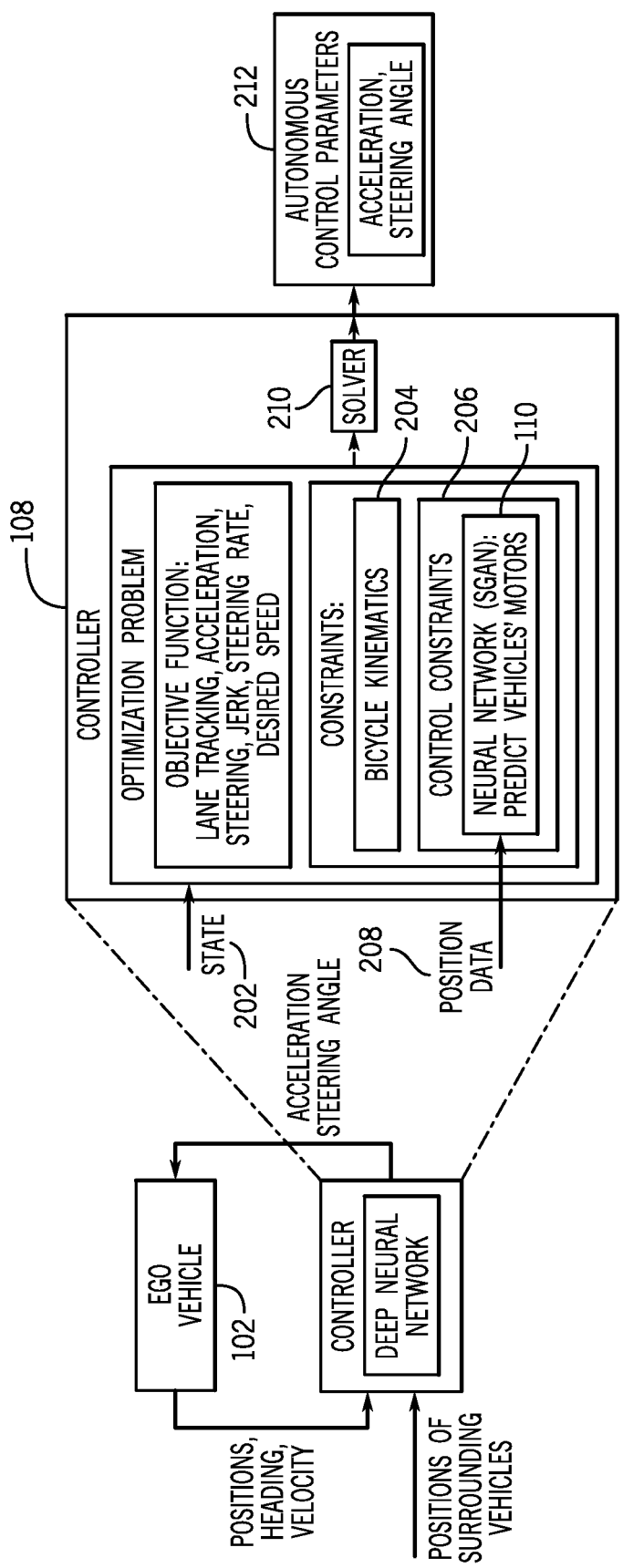
FIG. 2 is an overview of a control framework utilized by the application according to an exemplary embodiment of the present disclosure.

With continued reference to FIG. 1 and with reference to FIG. 2, an overview of a control framework utilized by the application 106, in an exemplary embodiment, the cooperation-aware application 106 may utilize the controller 108 to use model predictive control as a basis to systematically evaluate vehicle dynamic data of the ego vehicle 102 to determine a current state 202 of the ego vehicle 102. Such vehicle dynamic data may be associated with a position of the ego vehicle 102, a velocity of the ego vehicle 102, a heading of the ego vehicle 102, a steering angle of the ego vehicle 102, an acceleration of the ego vehicle 102, and the like. As discussed below, the vehicle dynamic data may be provided by vehicle dynamic sensors 112 of the ego vehicle 102 to be inputted by the cooperation-aware application 106 to the controller 108.

As discussed below, the controller 108 may utilize the current state 202 of the ego vehicle 102 to execute an optimization problem that determines costs to analyze the current state 202 of the ego vehicle 102 that may be utilized to predict one or more future states of the ego vehicle 102. The one or more future states may be predicted based on a bicycle kinematics model 204 that may be used to determine feasible trajectories of the ego vehicle 102 based on vehicle dynamic data included within the current state of the ego vehicle 102. For example, the bicycle kinematics model 204 may create a bicycle ego vehicle model to simulate simplified ego vehicle dynamics.

In one embodiment, the cooperation-aware application 106 may find locally optimal solutions that may be applied to satisfy control constraints 206 that may be computed as a minimum distance between the ego vehicle 102 and the surrounding vehicles that may occur during lane changing events to ensure that the ego vehicle 102 does not overlap with the paths of the surrounding vehicles during a lane change maneuver. To enable the ego vehicle 102 to operate within the control constraints 206, the application 106 may utilize the SGAN 110 to predict the interactive motions of the surrounding vehicles that may be located on the roadway on which the ego vehicle 102 is traveling. As discussed below, the predicted interactive motions may pertain to predicted positions of the surrounding vehicles that may be determined by the application 106 based on position data 208 that is inputted by the application 106 to the controller 108 to be analyzed by the SGAN 110.

Data pertaining to the states, constraints, and predicted ego vehicle's motion may be provided to a heuristic algorithm solver 210 that may be executed by the controller 108 to further perform a Monte-Carlo and Roll-out heuristic algorithm to generate N control candidates that include perspective vehicle dynamic parameters associated with a potential control of the ego vehicle 102 during a lane change maneuver. The controller 108 may propagate the predicted states of the ego vehicle 102 using various predicted dynamic parameters (e.g., velocities, positions, headings, steering angles, etc.) that may be applied with respect to the predicted positions of the surrounding vehicles to evaluate control candidates against the control constraints 206.

In particular, the controller 108 may evaluate the control candidates against the computed control constraints 206 to discard control candidates that do not satisfy minimum distance thresholds associated with the minimum distance between the ego vehicle 102 and the surrounding vehicles that may occur during lane changing events as included within the control constraints 206. The discarding of control candidates that do not adhere to the control constraints 206 may ensure that the ego vehicle 102 is not autonomously controlled in a manner that would allow a path of the ego vehicle 102 to come less than a threshold distance(s) of the surrounding vehicles and/or the path of the ego vehicle 102 to overlap with the paths of the surrounding vehicles during a lane change maneuver.

The controller 108 may utilize control candidates that satisfy minimum distance thresholds associated with the distance between the ego vehicle 102 and surrounding vehicles during a lane changing event as included within the control constraints 206 to output autonomous control parameters 212 in the form of acceleration parameters, steering angle parameters, braking parameters, and the like. As discussed below, the application 106 may be configured to communicate the autonomous control parameters 212 to a vehicle autonomous controller 116 of the ego vehicle 102 to autonomously control the ego vehicle 102 to smoothly merge into a target lane of the roadway on which the ego vehicle 102 is traveling while avoiding an overlap with the path(s) of surrounding vehicles that may be traveling on the roadway in accordance with the control constraints 206.

With continued reference to FIG. 1, in addition to the ECU 104, the ego vehicle 102 may also include a plurality of components, for example, the vehicle dynamic sensors 112, a storage unit 114, the vehicle autonomous controller 116, a vehicle camera system 118, a vehicle LiDAR system 120, and a vehicle systems/control units 122. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 114 to execute the one or more applications, operating systems, ego vehicle system and subsystem user interfaces, and the like that are stored within the storage unit 114.

In one embodiment, the ECU 104 may communicate with the vehicle autonomous controller 116 to execute autonomous driving commands to operate the ego vehicle 102 to be fully autonomously driven or semi-autonomously driven in a particular manner. As discussed below, the autonomous driving commands may be based on the autonomous control parameters 212 that may be determined by the controller 108 based on an execution of control candidates that adhere to computed control constraints 206.

As discussed below, based on one or more executable command instructions that may be communicated by the application 106, the vehicle autonomous controller 116 may be configured to autonomously control the ego vehicle 102 to operate in a manner based on the autonomous control parameters 212 that are output by the controller 108. For example, the cooperation-aware application 106 may send commands to the vehicle autonomous controller 116 to ensure that the ego vehicle 102 is autonomously operated to complete smooth acceleration, braking, and/or steering to smoothly change lanes from a current lane of the ego vehicle 102 to a target lane of the ego vehicle 102 while adhering to control constraints 206 computed by the controller 108.

In one or more embodiments, the vehicle autonomous controller 116 may autonomously control the operation of the ego vehicle 102 by providing one or more commands to one or more of the vehicle systems/control units 122 to provide full autonomous or semi-autonomous control of the ego vehicle 102. Such autonomous control of the ego vehicle 102 may be provided by sending one or more commands to control one or more of the vehicle systems/control units 122 to operate (e.g., drive) the ego vehicle 102 during one or more circumstances (e.g., when providing driver assist controls), and/or to fully control driving of the ego vehicle 102 during an entire trip of the ego vehicle 102.

The one or more commands may be provided to one or more vehicle systems/control units 122 that include, but are not limited to an engine control unit, a braking control unit, a transmission control unit, a steering control unit, and the like to control the ego vehicle 102 to be autonomously driven based on the autonomous control parameters 212 that are determined by the cooperation-aware application 106.

In one or more embodiments, the vehicle systems/control units 122 may be operably connected to the vehicle dynamic sensors 112 of the ego vehicle 102. The vehicle dynamic sensors 112 may be configured to receive inputs from one or more ego vehicle systems, sub-systems, control systems, and the like. In one embodiment, the vehicle dynamic sensors 112 may be included as part of a Controller Area Network (CAN) of the ego vehicle 102 and may be configured to provide vehicle dynamic data to the ECU 104 to be utilized for one or more ego vehicle systems, sub-systems, control systems, and the like. The vehicle dynamic sensors 112 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the vehicle dynamic sensors 112 may provide one or more values (e.g., numeric levels) that are associated with the real-time dynamic performance of the ego vehicle 102 as one or more driving maneuvers are conducted and/or as the ego vehicle 102 is controlled to be autonomously driven. As described below, the vehicle dynamic data that represents the current state 202 of the ego vehicle 102 may be provided by the cooperation-aware application 106 to the controller 108 to be further analyzed using the bicycle kinematics model 204.

In one or more embodiments, the storage unit 114 of the ego vehicle 102 may be configured to store one or more executable files associated with one or more operating systems, applications, associated operating system data, application data, ego vehicle system and subsystem user interface data, and the like that are executed by the ECU 104. In one or more embodiments, the storage unit 114 may be accessed by the cooperation-aware application 106 to store data associated with one or more control constraints 206 that may be computed and compared to one or more control candidates to determine one or more autonomous control parameters 212 that may be executed to autonomously control the ego vehicle 102.

With continued reference to FIG. 1, the vehicle camera system 118 may include one or more of the cameras (not shown) that may be positioned in one or more directions and at one or more areas to capture one or more images of the surrounding environment of the ego vehicle 102 (e.g., images of the roadway on which the ego vehicle 102 is traveling). The one or more cameras of the vehicle camera system 118 may be disposed at external front portions of the ego vehicle 102, including, but not limited to different portions of the ego vehicle dashboard, ego vehicle bumper, ego vehicle front lighting units, ego vehicle fenders, and the windshield. In one embodiment, the one or more cameras may be configured as RGB cameras that may capture RGB bands that are configured to capture rich information about object appearance, as well as relationships and interactions between the ego vehicle 102 and objects within the surrounding environment of the ego vehicle 102.

In other embodiments, the one or more cameras may be configured as stereoscopic cameras that are configured to capture environmental information in the form three-dimensional images. In one or more configurations, the one or more cameras may be configured to capture one or more first person viewpoint RGB images/videos of the surrounding environment of the ego vehicle 102. The vehicle camera system 118 may be configured to convert one or more RGB images/videos (e.g., sequences of images) into image data that is communicated to the cooperation-aware application 106 to be analyzed.

In an exemplary embodiment, the vehicle LiDAR system 120 may be operably connected to a plurality of LiDAR sensors (not shown). In particular, the vehicle LiDAR system 120 may include one or more planar sweep lasers that include respective three-dimensional LiDAR sensors that may be configured to oscillate and emit one or more laser beams of ultraviolet, visible, or near infrared light toward the scene of the surrounding environment of the ego vehicle 102. The plurality of LiDAR sensors may be configured to receive one or more reflected laser waves (e.g., signals) that are reflected off one or more objects such as surrounding vehicles located within the surrounding environment of the ego vehicle 102. In other words, upon transmitting the one or more laser beams to the surrounding environment of the ego vehicle 102, the one or more laser beams may be reflected as laser waves by one or more obstacles, static objects (e.g., traffic cones, lamp posts), and/or dynamic objects such as surrounding vehicles that may be located within the surrounding environment of the ego vehicle 102 at one or more points in time.

In one embodiment, each of the plurality of LiDAR sensors may be configured to analyze the reflected laser waves and output respective LiDAR data to the cooperation-aware application 106. The LiDAR data may include LiDAR coordinates that may be associated with the locations, positions, depths, and/or dimensions (e.g., measurements) of one or more dynamic objects such as the surrounding vehicles that may be located within the surrounding environment of the ego vehicle 102.

As discussed below, image data provided by the vehicle camera system 118 and/or the LiDAR data provided by the vehicle LiDAR system 120 may be communicated to the controller 108 in the form of position data 208 to be analyzed. The controller 108 may include a processing unit 124, a model predictive control analyzer (MPC analyzer) 126, and the SGAN 110. Data associated with the controller 108 and the components of the controller 108 may be stored on the storage unit 114 and/or an externally hosted computing infrastructure (not shown) that may be accessed through communications with a telematics control unit (not shown) of the ego vehicle 102 and the externally hosted computing infrastructure.

In an exemplary embodiment, the controller 108 may be controlled by the processing unit 124. The processing unit 124 may be configured to provide processing capabilities to be configured to utilize machine learning/deep learning to provide artificial intelligence capabilities that may be utilized to analyze inputted data and to output data by the MPC analyzer 126 and the SGAN 110 to the cooperation-aware application 106. Additionally, the processing unit 124 may be configured to provide processing capabilities to be configured to utilize machine learning/deep learning to provide artificial intelligence capabilities that may be utilized to employ the heuristic algorithm solver 210 of the processing unit 124 (e.g., sub-module of the processing unit 124) to further perform a Monte-Carlo and Roll-out heuristic algorithm to compute N control candidates.

For example, the processing unit 124 may process dynamic data in the form of the current state 202 of the ego vehicle 102 and/or position data 208 that is associated with the current position(s) of the surrounding vehicles that are inputted to the controller 108 and may access one or more datasets to provide various functions, that may include, but may not be limited to, prediction of a future state(s) of the ego vehicle 102, prediction of interactive motions of the surrounding vehicles, computation of control constraints 206, processing of control candidates, and the output of autonomous control parameters 212 to autonomously control the ego vehicle 102.

In one or more embodiments, the MPC analyzer 126 of the controller 108 may use model predictive control as a basis to systematically evaluate vehicle dynamic data of the ego vehicle 102 to determine a current state 202 of the ego vehicle 102. The MPC analyzer 126 may further execute the bicycle kinematics model 204 to evaluate the current state 202 of the ego vehicle 102 to thereby predict one or more future states of the ego vehicle 102 that pertain to a heading, position, and location of the ego vehicle 102 at one or more future time stamps (e.g., t+1, t+2).

The bicycle kinematics model 204 utilized by the MPC analyzer 126 may be a mathematical model that represents the ego vehicle 102 with two axles defined by a length between the axles (not shown) of the ego vehicle 102 and may thereby be used to predict future states of the ego vehicle 102. For example, the bicycle kinematics model 204 may be utilized to predict the steering angle associated with front wheels of the ego vehicle 102 and a heading of the ego vehicle 102 that may be defined at a center of a rear axle of the ego vehicle 102 with respect to the future states of the ego vehicle 102 at one or more future timeframes (e.g., at timeframe t+1).

In one embodiment, the SGAN 110 may be configured as a recurrent neural network that may be pre-trained with controller design parameters to complete motion prediction. The SGAN 110 may be configured to determine the center positions of the surrounding vehicles based on the position data 208 that may be inputted to the controller 108 and may predict the center positions of the surrounding vehicles over a prediction horizon as an output of the predicted motion of the surrounding vehicles (e.g., at timeframe t+1). The SGAN 110 may propagate the future state(s) of the ego vehicle 102 as predicted by the MPC analyzer 126 at each time step.

As discussed below, the SGAN 110 may also be configured to compute control constraints 206 using a vehicle shape model. In one or more embodiments, the processing unit 124 may employ the heuristic algorithm solver 210 to perform a Monte-Carlo and Roll-out heuristic algorithm to compute control candidates that may be executed to output respective autonomous control parameters 212 that may be used to operably control the autonomous operation of the ego vehicle 102. The controller 108 may be able to further determine control candidates that may adhere to the computed control constraints 206. The controller 108 may be configured to output autonomous control parameters 212 that may be based on the execution of the control candidates that are determined to adhere to the computed control constraints 206 to ensure that the ego vehicle 102 completes a lane change to a target lane in a smooth manner.

II. The Cooperation-Aware Dense Traffic Control Application and Related Methods

Components of the cooperation-aware application 106 will now be described according to an exemplary embodiment and with reference to FIG. 1. In an exemplary embodiment, the cooperation-aware application 106 may be stored on the storage unit 114 and executed by the ECU 104 of the ego vehicle 102. In another embodiment, the cooperation-aware application 106 may be stored on an externally hosted computing infrastructure and may be accessed by the telematics control unit of the ego vehicle 102 to be executed by the ECU 104 of the ego vehicle 102.

The general functionality of cooperation-aware application 106 will now be discussed. In an exemplary embodiment, the cooperation-aware application 106 may include a plurality of modules 128-134 that may be configured to provide cooperation-aware lane change control in dense traffic. The plurality of modules 128-134 may include a data reception module 128, a vehicle state module 130, an interactive prediction module 132, and an autonomous control module 134. However, it is appreciated that the cooperation-aware application 106 may include one or more additional modules and/or sub-modules that are included in lieu of the modules 128-132.

Figure 3:
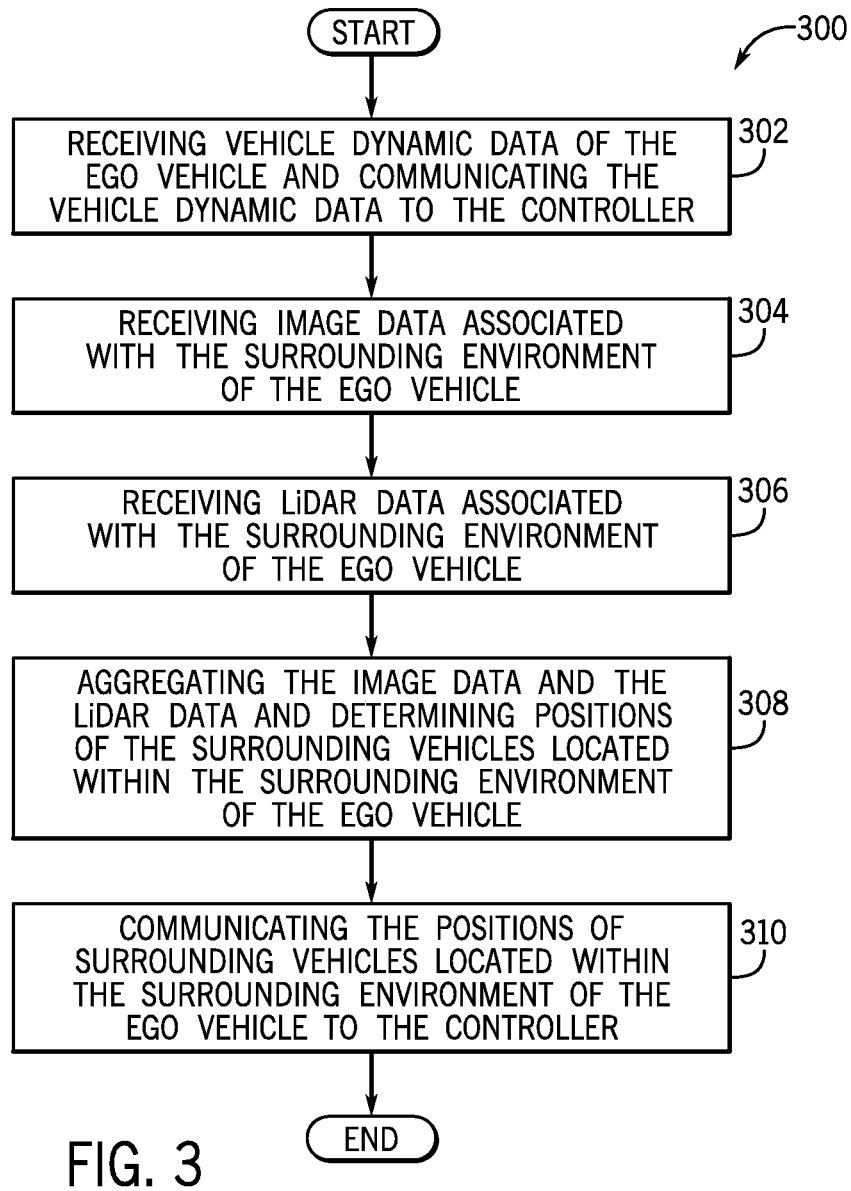
FIG. 3 is a process flow diagram of a method for communicating vehicle dynamic data and ego vehicle environmental data to a controller according to an exemplary embodiment of the present disclosure.

FIG. 3 is a process flow diagram of a method 300 for communicating vehicle dynamic data and ego vehicle environmental data to the controller 108 according to an exemplary embodiment of the present disclosure. FIG. 3 will be described with reference to the components of FIG. 1 and FIG. 2 though it is to be appreciated that the method 300 of FIG. 3 may be used with other systems/components. The method 300 may begin at block 302, wherein the method 300 may include receiving vehicle dynamic data of the ego vehicle 102 and communicating the vehicle dynamic data to the controller 108.

In an exemplary embodiment, the data reception module 128 of the cooperation-aware application 106 may be configured to communicate with the vehicle dynamic sensors 112 of the ego vehicle 102 to receive real-time vehicle dynamic data that is associated with a plurality of ego vehicle dynamic parameters. The real-time vehicle dynamic data may include, but may not be limited to data that pertains to a current position of the ego vehicle 102, a current heading of the ego vehicle 102, a current velocity of the ego vehicle 102, a current steering angle of a steering of the ego vehicle 102, a current steering speed associated with the steering of the ego vehicle 102, a current throttle angle of a throttle of the ego vehicle 102, a current acceleration of the ego vehicle 102, a current yaw rate of the ego vehicle 102, a current brake force associated with the brakes of the ego vehicle 102, a current transmission gear of the ego vehicle 102, a current geo-location of the ego vehicle 102, and the like.

In one embodiment, upon receiving the vehicle dynamic data from the vehicle dynamic sensors 112, the data reception module 128 may be configured to communicate respective data to the vehicle state module 130. In one embodiment, the vehicle state module 130 may be configured to analyze the vehicle dynamic data associated with the plurality of ego vehicle dynamic parameters and may electronically package the vehicle dynamic data in the form of a current state 202 of the ego vehicle 102. The vehicle state module 130 may communicate the current state 202 of the ego vehicle 102 to the controller 108 to thereby be analyzed by the MPC analyzer 126, as discussed below.

The method 300 may proceed to block 304, wherein the method 300 may include receiving image data associated with the surrounding environment of the ego vehicle 102. In an exemplary embodiment, the data reception module 128 may be configured to receive environmental data that may be associated with the surrounding environment of the ego vehicle 102 in the form of image data that may be provided by the vehicle camera system 118 of the ego vehicle 102. As discussed above, the image data may pertain to one or more RGB images/video of the surrounding vehicles that are located within the surrounding environment of the ego vehicle 102 that are captured by one or more cameras that are operably connected to the vehicle camera system 118. In some embodiments, the data reception module 128 may package and store the image data on the storage unit 114 to be evaluated at one or more points in time.

The method 300 may proceed to block 306, wherein the method 300 may include receiving LiDAR data associated with the surrounding environment of the ego vehicle 102. In an exemplary embodiment, the data reception module 128 may be configured to receive the environmental data in the form of LiDAR data that may be provided by the vehicle LiDAR system 120 and may be associated with the one or more reflected laser waves. In other words, the LiDAR data may include LiDAR based observations associated with surrounding vehicles that may be located within the surrounding environment of the ego vehicle 102. In some embodiments, the data reception module 128 may package and store the LiDAR data on the storage unit 114 to be evaluated at one or more points in time.

The method 300 may proceed to block 308, wherein the method 300 may include aggregating the image data and the LiDAR data and determining positions of surrounding vehicles located within the surrounding environment of the ego vehicle 102. In an exemplary embodiment, the data reception module 128 may be configured to analyze the image data and the LiDAR data to determine data points that correspond to one or more particular surrounding vehicles. Such corresponding data points may be based on one or more cameras and one or more LiDAR sensors that may be disposed at one or more corresponding portions of the ego vehicle 102, one or more cameras and one or more LiDAR sensors that may be capturing data associated with one or more consistent directions associated with the surrounding environment of the ego vehicle 102, and/or one or more surrounding vehicles that may be included within captured data points within the image data and the LiDAR data at one or more simultaneous time steps.

The method 300 may proceed to block 310, wherein the method 300 may include communicating the positions of surrounding vehicles located within the surrounding environment of the ego vehicle 102 to the controller 108. In an exemplary embodiment, upon receiving the aggregated image LiDAR data, the interactive prediction module 132 may be configured to analyze the aggregated image LiDAR data and determine position coordinates associated with the positions of each of the surrounding vehicles located within the surrounding environment of the ego vehicle 102. The position coordinates may be determined as fixed coordinates that may pertain to the position of each of the surrounding vehicles from the perspective of a center point of the ego vehicle 102. Upon determining the position coordinates of the surrounding vehicles, the interactive prediction module 132 may be configured to communicate the position coordinates as position data 208 that pertains to the positions of the surrounding vehicles to the controller 108. As discussed below, the position data 208 may be inputted to the SGAN 110 to predict interactive motions of the surrounding vehicles located within the surrounding environment of the ego vehicle 102.

Figure 4:
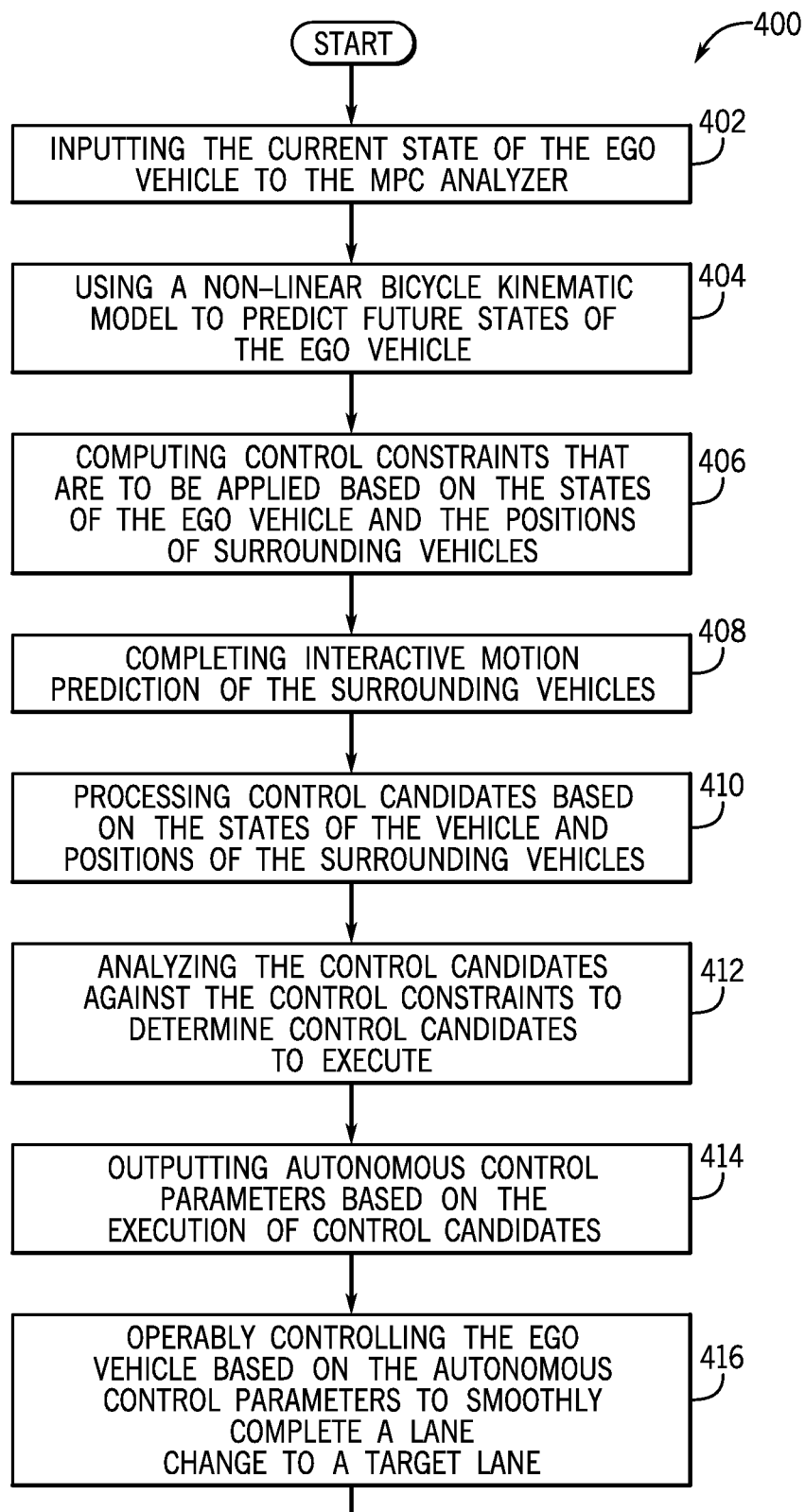
FIG. 4 is a process flow diagram of a method to determine autonomous control parameters to provide cooperation-aware lane change control in dense traffic according to an exemplary embodiment of the present disclosure.

FIG. 4 is a process flow diagram of a method 400 to determine autonomous control parameters 212 to provide cooperation-aware lane change control in dense traffic according to an exemplary embodiment of the present disclosure. FIG. 4 will be described with reference to the components of FIG. 1 and FIG. 2 though it is to be appreciated that the method 400 of FIG. 4 may be used with other systems/components. The method 400 may begin at block 402, wherein the method 400 may include inputting the current state 202 of the ego vehicle 102 to the MPC analyzer 126. As discussed above (with respect to block 302 of FIG. 3), the vehicle state module 130 may be configured to analyze the vehicle dynamic data associated with the plurality of ego vehicle dynamic parameters and may electronically package the vehicle dynamic data in the form of a current state 202 of the ego vehicle 102. In one configuration, the vehicle state module 130 may be configured to input the current state 202 of the ego vehicle 102 to the MPC analyzer 126 of the controller 108.

The method 400 may proceed to block 404, wherein the method 400 may include using the non-linear bicycle kinematics model 204 to predict future states of the ego vehicle 102. In an exemplary embodiment, upon receiving the input of the current state 202 of the ego vehicle 102 from the vehicle state module 130, the MPC analyzer 126 may be configured to execute the bicycle kinematics model 204 to compute future states of the ego vehicle 102 based on the current position of the ego vehicle 102 and current particular vehicle dynamic parameters of the ego vehicle 102.

In one embodiment, the kinematics may be represented as:

$$\dot{x} = v\cos(\psi + \beta)$$
$$\dot{y} = v\sin(\psi + \beta)$$
$$\dot{\psi} = \frac{v}{l_r}\sin(\beta)$$
$$\dot{v} = a$$
$$\beta = \tan^{-1}\left(\frac{l_r}{l_f + l_r}\tan(\delta)\right)$$

where (x, y) is a Cartesian coordinate for a center point of the ego vehicle 102, ψ is the initial heading of the ego vehicle 102, v is the speed of the ego vehicle 102, a is the acceleration of the ego vehicle's center in the same direction as the velocity of the ego vehicle 102. Designations $l_f$ and $l_r$ indicate the distance from the center of the ego vehicle 102 to the front axles and the rear axles of the ego vehicle 102, respectively. The control inputs are: (front wheel) steering angle δ and acceleration a.

In one configuration, the MPC analyzer 126 may use Euler discretization to obtain a discrete-time dynamic model of the future states of the ego vehicle 102 in the form:

$$z(t+1) = f(z(t), u(t)),$$

where $z = [x\ y\ \psi\ v]^T$ and $u = [a\ \delta]^T$. Accordingly, the future states of the ego vehicle 102 may include a future predicted position of the center point of the ego vehicle 102, a future predicted initial heading of the ego vehicle 102, a future predicted velocity of the ego vehicle 102, a future predicted acceleration of the ego vehicle 102, a future predicted steering angle of the ego vehicle 102 (e.g., at t+1 timeframe). It is appreciated that the future states of the ego vehicle 102 may include additional or alternate future predicted dynamic parameters associated with the ego vehicle 102 at one or more future timeframes.

The method 400 may proceed to block 406, wherein the method 400 may include computing control constraints 206 that are to be applied based on the states of the ego vehicle 102 and the positions of the surrounding vehicles. In an exemplary embodiment, upon predicting the future states of the ego vehicle 102, the MPC analyzer 126 may communicate the current state 202 and the future states of the ego vehicle 102 to the SGAN 110. As discussed at block 310 of the FIG. 3, upon determining the position coordinates of the surrounding vehicles, the interactive prediction module 132 may be configured to communicate the position coordinates as position data 208 that pertains to the positions of the surrounding vehicles to the controller 108. In particular, the position data 208 may be inputted to the SGAN 110 of the controller 108 to be further analyzed with respect to the states of the ego vehicle 102.

In an exemplary embodiment, the control objective of the SGAN 110 may be to smoothly merge the ego vehicle 102 to a target lane. Accordingly, the control objective may indicate a preference with respect to smooth accelerations and steering for occupant comfort. In one embodiment, the objective function may be formulated as:

$$J = \Sigma \ell_{=t}^{t+T} \lambda\, \text{div}(x\ell|t); x_{end}) D(\ell|t)$$
$$+ \Sigma \ell_{=t}^{t+T} \lambda_v \|v(\ell|t) - v^{ref}\|^2$$
$$+ \Sigma \ell_{=t}^{t+T-1} \lambda_\delta \|\delta(\ell|t)\|^2$$
$$+ \Sigma \ell_{=t}^{t+T-1} \lambda_a \|a(\ell|t)\|^2$$
$$+ \Sigma \ell_{=t}^{T-1} \lambda \Delta_\delta \|\delta(\ell|t) - \delta(\ell-1|t)\|^2$$
$$+ \Sigma \ell_{=t}^{T-1} \lambda \Delta_\delta \|a(\ell|t) - a(\ell-1|t)\|^2$$

where $(\ell|t)$ indicates time $\ell$ based on the measurements at time t. Symbol $x_{end}$ is the latitude coordinates of an end of a lane in a circumstance that a present lane of the ego vehicle 102 is ending and the ego vehicle 102 must merge to a target lane before reaching the end of the lane. $D(\ell|t)$ is the distance norm for the vector between the ego vehicle's center point and the target lane at time $\ell$ and $v^{ref}$ is the reference velocity. Each penalty is regularized by the SGAN 110 with λ div,$\lambda v, \lambda_\delta, \lambda_a\|, \lambda\ \Delta_\delta$, and $\lambda \Delta_\delta$ respectively. A timely lane change may thereby be incentivized with a dynamic weight λ div. The divergence of the center point of the ego vehicle 102 from the vertical center of the target lane may be penalized. Also, the control effort of steering angle, acceleration, jerking, and/or steering rate may be penalized if not abiding by the control objective.

In one embodiment, the distance measurement between two vehicles may be considered by the SGAN 110. The distance measurement may be based on the shape of the ego vehicle 102 and the surrounding vehicles. Accordingly, with respect to FIG. 5, an illustrative example of a vehicle shape model executed by the SGAN 110, the SGAN 110 may model the ego vehicle 102 and the surrounding vehicles 502-512 with respect to three regions, using a circle model that designated circles over a front, middle, and rear portion of the ego vehicle 102 and the surrounding vehicles 502-512.

With the circle model, the control constraints 206 that conform with the control objective with respect to the ego vehicle 102 i may be formulated as:

$$g_i(x, y) = \min_{p,q \in \{-1,0,1\}} d_i(p, q) \geq \epsilon,$$

where:

$$d_i(p, q) =$$
$$\left\{ \begin{array}{l} ((x + p(h-w)\cos\psi) - (x_i + q(h_i - w_i)\cos\psi_i))^2 + \\ ((y + p(h-w)\sin\psi) - (y_i + q(h_i - w_i)\sin\psi_i))^2 \end{array} \right\}^{\frac{1}{2}} - (w + w_2)$$

where w and h are, respectively, half width and half height of each vehicle respectively, and ϵ is a control bound. The control constraints 206 may include minimum distance thresholds that are associated with the minimum distance between the ego vehicle 102 and the surrounding vehicles that may be allowed to ensure that the ego vehicle 102 does not come less than a threshold distance(s) of the surrounding vehicles and/or the path of the ego vehicle 102 does not overlap with the paths of the surrounding vehicles during a lane change maneuver while ensuring that the lane change is completed in a smooth manner.

With continued reference to FIG. 4, the method 400 may proceed to block 408, wherein the method 400 may include completing interactive motion prediction of the surrounding vehicles. The SGAN 110 may take account the motion of the surrounding vehicles as motions that are responsive to each other and may accordingly predict the motions of all of the surrounding vehicles located within the surrounding environment of the ego vehicle 102 simultaneously. The SGAN 110 may include a generator (not shown) and discriminator (not shown) that are adversarial to one another. The generator and discriminator may be configured as long-short term memory (LSTM) networks to account for the sequential nature of the motion of the surrounding vehicles.

In one embodiment, the SGAN 110 may be configured to pool the motion states of the surrounding vehicles with each other to evaluate their interactions thereby generating interactions as a pooled tensor $P_i$ for each surrounding vehicle i. The decoder may thereby predict multiple trajectories that are socially interactive with each other. The SGAN 110 may take as an input the sequence of positions based on the inputted position data 208 associated with each of the surrounding vehicles over an observation time horizon $T_{obs}$. The SGAN 110 may output a sequence of positions for each of the surrounding vehicles over a prediction time horizon $T_{pred}$. The sequence of positions may be based on predicted coordinates for center points of each of the surrounding vehicles.

In an exemplary embodiment, the SGAN 110 may be configured to incorporate the predicted coordinates for the center points of each of the surrounding vehicles to the computed control constraints 206. The SGAN 110 may take function $\phi(t)$:

$$\begin{pmatrix} (x_1(t), y_1(t)) & \cdots & (x_N(t), y_N(t)) \\ \vdots & \ddots & \vdots \\ (x_1(t-T_{obs}+1), & & (x_N(t-T_{obs}+1), \\ y_1(t-T_{obs}+1) & \cdots & y_N(t-T_{obs}+1) \end{pmatrix}$$

$$\begin{pmatrix} (\hat{x}_i(t+1), \hat{y}_i(t+1)) & \cdots & (\hat{x}_N(t+1), \hat{y}_N(t+1)) \\ \vdots & \ddots & \vdots \\ (\hat{x}_i(t+T_{pred}), \hat{y}_i(t+T_{pred}) & \cdots & (\hat{x}_N(t+T_{pred}), \hat{y}_N(t+T_{pred}) \end{pmatrix}$$

where $\hat{\cdot}$ indicates a predicted value. Given the observations under time t, the coordinates of surrounding vehicle(s) i at time t+1 are represented as $\hat{x}_i(t+1)=\phi_{i,x}(t)$ and $\hat{y}_i(t+1)=\phi_{i,y}(t)$. In an exemplary embodiment, the SGAN 110 may output the interactive motion prediction associated with each of the surrounding vehicles to the interactive prediction module 132 of the cooperation-aware application 106. The vehicle state module 130 and the interactive prediction module 132 may be configured to respectively communicate the states (e.g., current and future states) of the ego vehicle 102 and the interactive motion prediction of the future positions of the surrounding vehicles to the autonomous control module 134 of the cooperation-aware application 106.

The method 400 may proceed to block 410, wherein the method 400 may include processing control candidates based on the states of the ego vehicle 102 and the positions of the surrounding vehicles. In an exemplary embodiment, the autonomous control module 134 may communicate with the processing unit 124 of the controller 108 to process control candidates that are based on the current state 202 and future predicted states of the ego vehicle 102 included the sequence of future positions of each of the surrounding vehicles over a prediction time horizon (as the interactive motion prediction of the surrounding vehicles). The processing unit 124 may employ the heuristic algorithm solver 210 to execute a rollout-based algorithm that finds locally optimal solutions in a time efficient manner. From a current state 202 at time t, the heuristic algorithm solver 210 may generate a finite set of control candidates over the time horizon T, $U=\{U_1, \ldots, U_j, \ldots, U_{Nsim}\}$ where $U_j=[u_j(0|t) \ldots u_j(T-1|t)]^T$.

The method 400 may proceed to block 412, wherein the method 400 may include analyzing the control candidates against the control constraints 206 to determine control candidates to execute. In an exemplary embodiment, upon the heuristic algorithm solver 210 processing the finite set of control candidates over the time horizon T, the controller 108 may be configured to analyze the control candidates against the previously computed control constraints 206 (as discussed at block 406). In one configuration, the controller 108 may be configured to evaluate a cumulative cost for each control candidate based on minimum distance thresholds associated with the minimum distance between the ego vehicle 102 and the surrounding vehicles that may be based on the control constraints 206. As discussed, the minimum distance thresholds may be associated with the minimum distance between the predicted position(s) of the ego vehicle 102 and the predicted position(s) of the surrounding vehicles that occur during lane changing events to ensure that the ego vehicle 102 does not come less than a threshold distance(s) of the surrounding vehicles and/or the path of the ego vehicle 102 does not overlap with the paths of the surrounding vehicles during a lane change maneuver while ensuring that the lane change is completed in a smooth manner.

In one embodiment, the controller 108 may propagate the ego vehicle 102 given the action $U_j$ and may analyze each of the control candidates against the control constraints 206. For example, the controller 108 may analyze the control candidates against minimum distance thresholds associated with the minimum distance between the ego vehicle 102 and the surrounding vehicles that may be included within the control constraints 206. In one embodiment, the controller 108 may be configured to discard control candidates that do not adhere to the control constraints 206.

The method 400 may proceed to block 414, wherein the method 400 may include outputting autonomous control parameters 212 based on the execution of control candidates. In an exemplary embodiment, upon discarding control candidates that do not adhere to the control constraints 206, the controller 108 may utilize the control candidates that do adhere to the control constraints 206 by satisfying the minimum distance thresholds associated with the distance between the ego vehicle 102 and surrounding vehicles during a lane changing event to output autonomous control parameters 212 in the form of acceleration parameters, steering angle parameters, braking parameters, and the like. The autonomous control parameters 212 may be output to the autonomous control module 134 to thereby be executed.

In some circumstances, it may be possible that there are no control candidates that adhere to the control constraints 206 at a particular time step. Accordingly, all of the control candidates may be discarded. For the particular time step, the autonomous control parameters 212 may be output as maximum braking parameters and/or zero steering parameters to ensure that during the particular time step the ego vehicle 102 is not controlled to complete a lane change if there is no feasible area to do so. During subsequent time steps the control candidates may be thereby analyzed to determine control candidates that may adhere to the control constraints 206. As such, upon determining control candidates that do adhere to the control constraints 206, the controller 108 may utilize the control candidates that do adhere to the control constraints 206 by satisfying the minimum distance thresholds associated with the distance between the ego vehicle 102 and surrounding vehicles during a lane changing event to output autonomous control parameters 212.

The method 400 may proceed to block 416, wherein the method 400 may include operably controlling the ego vehicle 102 based on the autonomous control parameters 212 to smoothly complete a lane change to a target lane. In one embodiment, upon receiving the autonomous control parameters 212 that are output by the controller 108 (at block 414), the autonomous control module 134 may be configured to execute the autonomous control parameters 212 to autonomously control the ego vehicle 102. In particular, upon execution of the autonomous control parameters 212, the autonomous control module 134 may communicate one or more commands associated with each of the autonomous control parameters 212 to the vehicle autonomous controller 116.

The vehicle autonomous controller 116 may thereby operably control one or more components, systems, sub-systems of the ego vehicle 102 to autonomously operate the ego vehicle 102 according to the autonomous control parameters 212 that are output by the controller 108 to smoothly merge the ego vehicle 102 into a target lane. In particular, the ego vehicle 102 may be operably controlled to autonomously operate (e.g., with the application of a particular speed, acceleration, steering angle, throttle angle, braking force, etc.) according to the autonomous control parameters 212 that adhere to the control constraints 206 to smoothly merge into a target lane of the roadway on which the ego vehicle 102 is traveling. Accordingly, the cooperation-aware application 106 promotes a cooperation-aware lane change control of the ego vehicle 102 that may occur in a dense traffic condition.

Figure 6:
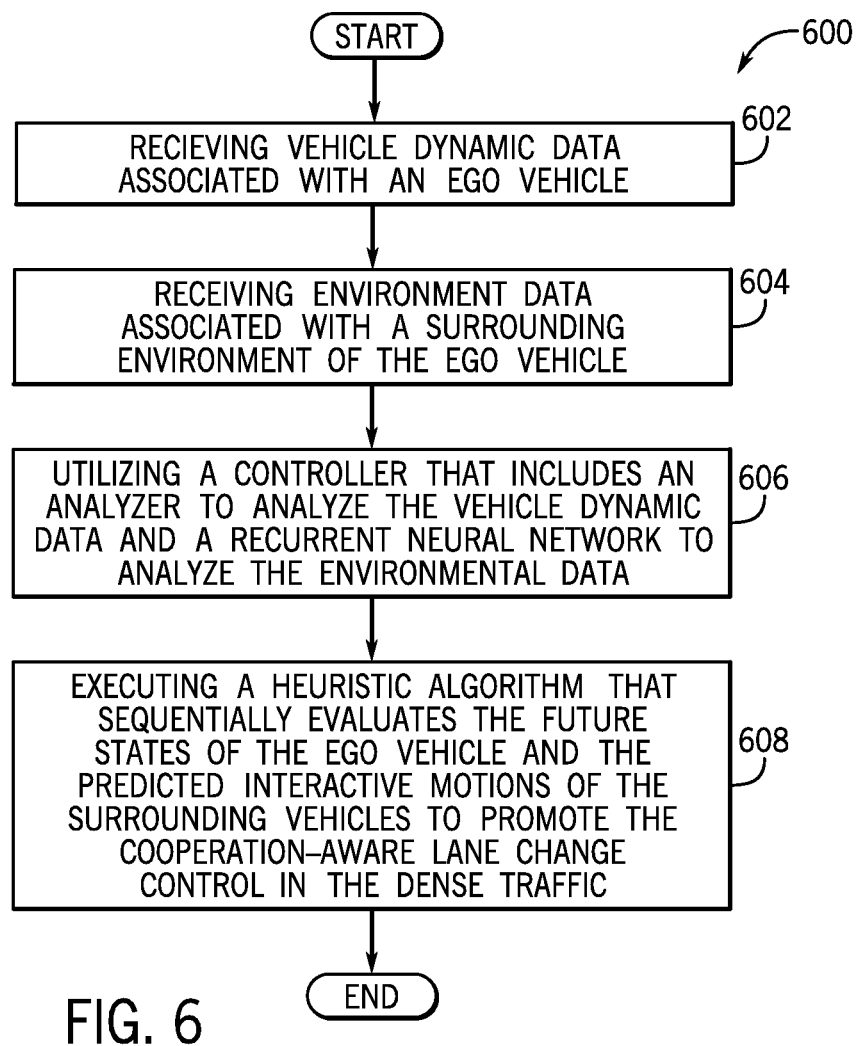
FIG. 6 is a process flow diagram of a method for providing cooperation-aware lane change control in dense traffic according to an exemplary embodiment of the present disclosure.

FIG. 6 is a process flow diagram of a method 600 for providing cooperation-aware lane change control in dense traffic according to an exemplary embodiment of the present disclosure. FIG. 6 will be described with reference to the components of FIG. 1 and FIG. 2 though it is to be appreciated that the method 600 of FIG. 6 may be used with other systems/components. The method 600 may begin at block 602, wherein the method 600 may include receiving vehicle dynamic data associated with an ego vehicle 102. The method 600 may proceed to block 604, wherein the method 600 may include receiving environment data associated with a surrounding environment of the ego vehicle 102.

The method 600 may proceed to block 606, wherein the method 600 may include utilizing a controller 108 that includes an analyzer to analyze the vehicle dynamic data and a recurrent neural network to analyze environmental data. In one embodiment, the analyzer is configured to use model predictive control to determine the future states of the ego vehicle 102 and the recurrent neural network is configured as a trained social generative adversarial network that is configured to predict interactive motions of surrounding vehicles located within the surrounding environment of the ego vehicle 102. The method 600 may proceed to block 608, wherein the method 600 may include executing a heuristic algorithm that sequentially evaluates the future states of the ego vehicle 102 and the predicted interactive motions of the surrounding vehicles to promote the cooperation-aware lane change control in the dense traffic.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing cooperation-aware lane change control in dense traffic comprising:
    receiving vehicle dynamic data that is electronically captured by vehicle dynamic sensors associated with an ego vehicle;
    receiving environment data associated with a surrounding environment of the ego vehicle based on image data received from a vehicle camera system and LiDAR data received from a vehicle LiDAR system;
    utilizing an electronic controller that includes an analyzer to electronically analyze the vehicle dynamic data and a recurrent neural network to analyze the environment data, wherein the analyzer is configured to predict future states of the ego vehicle and the recurrent neural network is configured to predict interactive motions of surrounding vehicles located within the surrounding environment of the ego vehicle; and
    executing a heuristic algorithm that sequentially evaluates the future states of the ego vehicle and the predicted interactive motions of the surrounding vehicles with respect to an adherence to control constraints that are computed to provide autonomous control parameters that promote the cooperation-aware lane change control in the dense traffic, wherein the autonomous control parameters are executed to operably control the ego vehicle to change lanes to promote the cooperation-aware lane change control in the dense traffic.

2. The computer-implemented method of claim 1, wherein receiving vehicle dynamic data includes analyzing the vehicle dynamic data that is associated with a plurality of ego vehicle dynamic parameters and electronically packaging the vehicle dynamic data in a form of a current state of the ego vehicle.

3. The computer-implemented method of claim 2, wherein receiving the environment data includes receiving image data and LiDAR data associated with the surrounding environment of the ego vehicle, wherein the image data and the LiDAR data are aggregated and position coordinates associated with positions of the surrounding vehicles are determined.

4. The computer-implemented method of claim 3, wherein utilizing the electronic controller includes inputting the current state to the analyzer to analyze the vehicle dynamic data, wherein the analyzer is configured to use model predictive control and uses a non-linear bicycle kinematics model to predict the future states of the ego vehicle based on the vehicle dynamic data, wherein the future states of the ego vehicle include a future predicted position of a center point of the ego vehicle.

5. The computer-implemented method of claim 3, wherein utilizing the electronic controller includes inputting position data to the recurrent neural network to analyze the environment data, wherein a control objective to smoothly change lanes to a target lane is processed to compute the control constraints.

6. The computer-implemented method of claim 5, wherein locally optimal solutions are applied to satisfy the control constraints that include minimum distance thresholds that are computed as a minimum distance between the ego vehicle and the surrounding vehicles that is allowed to ensure that the ego vehicle does not come less than a threshold distance of the surrounding vehicles and a path of the ego vehicle does not overlap with paths of the surrounding vehicles.

7. The computer-implemented method of claim 6, wherein the recurrent neural network is configured as a trained social generative adversarial network that pools motion states of the surrounding vehicles to evaluate their interactions, wherein multiple trajectories of each of the surrounding vehicles that are socially interactive with each other are predicted and a sequence of positions of each of the surrounding vehicles over a prediction time horizon is outputted.

8. The computer-implemented method of claim 7, wherein executing the heuristic algorithm includes processing control candidates based on the future states of the ego vehicle and the sequence of positions of each of the surrounding vehicles over the prediction time horizon, wherein the heuristic algorithm is executed to generate control candidates that include perspective vehicle dynamic parameters associated with a potential control of the ego vehicle during a lane change maneuver.

9. The computer-implemented method of claim 8, wherein the control candidates are compared to the control constraints to determine control candidates that adhere to the control constraints, wherein at least one control candidate that adheres to the control constraints is utilized by the controller to output the autonomous control parameters that are executed to operably control the ego vehicle to smoothly change lanes to the target lane to promote the cooperation-aware lane change control in the dense traffic.

10. A system for providing cooperation-aware lane change control in dense traffic comprising:
a memory storing instructions when executed by a processor cause the processor to:
receive vehicle dynamic data that is electronically captured by vehicle dynamic sensors associated with an ego vehicle;
receive environment data associated with a surrounding environment of the ego vehicle based on image data received from a vehicle camera system and LiDAR data received from a vehicle LiDAR system;
utilize an electronic controller that includes an analyzer to electronically analyze the vehicle dynamic data and a recurrent neural network to analyze the environment data, wherein the analyzer is configured to predict future states of the ego vehicle and the recurrent neural network is configured to predict interactive motions of surrounding vehicles located within the surrounding environment of the ego vehicle; and
execute a heuristic algorithm that sequentially evaluates the future states of the ego vehicle and the predicted interactive motions of the surrounding vehicles with respect to an adherence to control constraints that are computed to provide autonomous control parameters that promote the cooperation-aware lane change control in the dense traffic, wherein the autonomous control parameters are executed to operably control the ego vehicle to change lanes to promote the cooperation-aware lane change control in the dense traffic.

11. The system of claim 10, wherein receiving vehicle dynamic data includes analyzing the vehicle dynamic data that is associated with a plurality of ego vehicle dynamic parameters and electronically packaging the vehicle dynamic data in a form of a current state of the ego vehicle.

12. The system of claim 11, wherein receiving the environment data includes receiving image data and LiDAR data associated with the surrounding environment of the ego vehicle, wherein the image data and the LiDAR data are aggregated and position coordinates associated with positions of the surrounding vehicles are determined.

13. The system of claim 12, wherein utilizing the electronic controller includes inputting the current state to the analyzer to analyze the vehicle dynamic data, wherein the analyzer is configured to use model predictive control and uses a non-linear bicycle kinematics model to predict the future states of the ego vehicle based on the vehicle dynamic data, wherein the future states of the ego vehicle include a future predicted position of a center point of the ego vehicle.

14. The system of claim 12, wherein utilizing the electronic controller includes inputting the position data to recurrent neural network to analyze the environment data, wherein a control objective to smoothly change lanes to a target lane is processed to compute the control constraints.

15. The system of claim 14, wherein locally optimal solutions are applied to satisfy the control constraints that include minimum distance thresholds that are computed as a minimum distance between the ego vehicle and the surrounding vehicles that is allowed to ensure that the ego vehicle does not come less than a threshold distance of the surrounding vehicles and a path of the ego vehicle does not overlap with paths of the surrounding vehicles.

16. The system of claim 15, wherein the recurrent neural network is configured as a trained social generative adversarial network that pools motion states of the surrounding vehicles to evaluate their interactions, wherein multiple trajectories of each of the surrounding vehicles that are socially interactive with each other are predicted and a sequence of positions of each of the surrounding vehicles over a prediction time horizon is outputted.

17. The system of claim 16, wherein executing the heuristic algorithm includes processing control candidates based on the future states of the ego vehicle and the sequence of positions of each of the surrounding vehicles over the prediction time horizon, wherein the heuristic algorithm is executed to generate control candidates that include perspective vehicle dynamic parameters associated with a potential control of the ego vehicle during a lane change maneuver.

18. The system of claim 17, wherein the control candidates are compared to the control constraints to determine control candidates that adhere to the control constraints, wherein at least one control candidate that adheres to the control constraints is utilized by the controller to output the autonomous control parameters that are executed to operably control the ego vehicle to smoothly change lanes to the target lane to promote the cooperation-aware lane change control in the dense traffic.

19. A non-transitory computer readable storage medium storing instructions that when executed by a computer, which includes a processor perform a method, the method comprising:
  receiving vehicle dynamic data that is electronically captured by vehicle dynamic sensors associated with an ego vehicle;
  receiving environment data associated with a surrounding environment of the ego vehicle based on image data received from a vehicle camera system and LiDAR data received from a vehicle LiDAR system;
  utilizing an electronic controller that includes an analyzer to electronically analyze the vehicle dynamic data and a recurrent neural network to analyze the environment data, wherein the analyzer is configured to predict future states of the ego vehicle and the recurrent neural network is configured to predict interactive motions of surrounding vehicles located within the surrounding environment of the ego vehicle; and
  executing a heuristic algorithm that sequentially evaluates the future states of the ego vehicle and the predicted interactive motions of the surrounding vehicles to promote a cooperation-aware lane change control in dense traffic, wherein autonomous control parameters are executed to operably control the ego vehicle to change lanes with respect to an adherence to control constraints that are computed to provide autonomous control parameters that promote the cooperation-aware lane change control in the dense traffic.

20. The non-transitory computer readable storage medium of claim 19, wherein executing the heuristic algorithm includes processing control candidates based on the future states of the ego vehicle and a sequence of positions of each of the surrounding vehicles over a prediction time horizon, wherein the heuristic algorithm is executed to generate control candidates that include perspective vehicle dynamic parameters associated with a potential control of the ego vehicle during a lane change maneuver, wherein at least one control candidate of the control candidates is utilized by the controller to output the autonomous control parameters that are executed to operably control the ego vehicle to smoothly change lanes to a target lane to promote the cooperation-aware lane change control in the dense traffic.

* * * * *